May 17, 1955
E. KOLISCH
2,708,368
EQUIPMENT FOR RATING BY VOLUME, WEIGHT AND ZONE
Filed Dec. 21, 1950
2 Sheets-Sheet 1
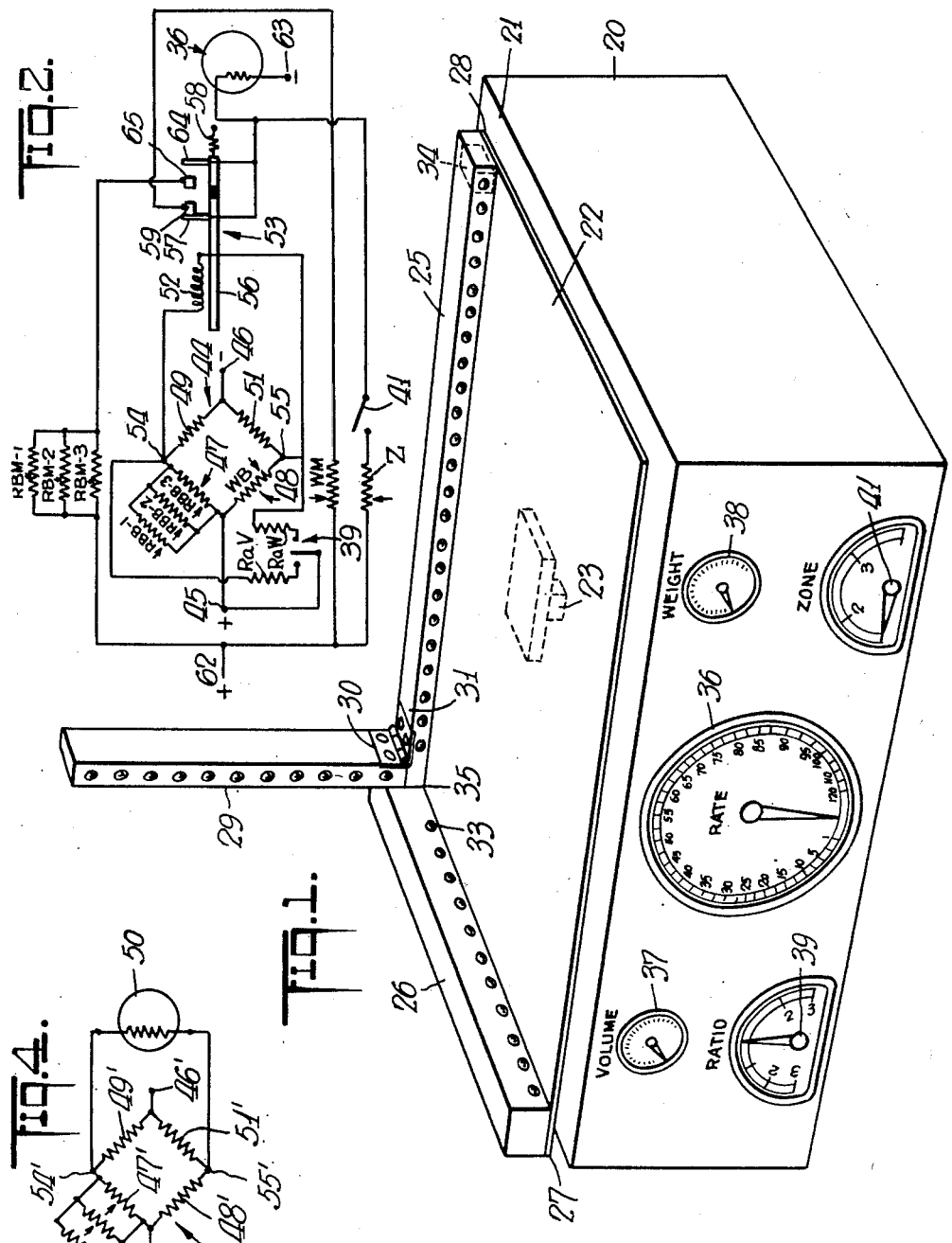
INVENTOR
*Emil Kolisch*
BY
*Davis Faubank Hirsch*
ATTORNEYS

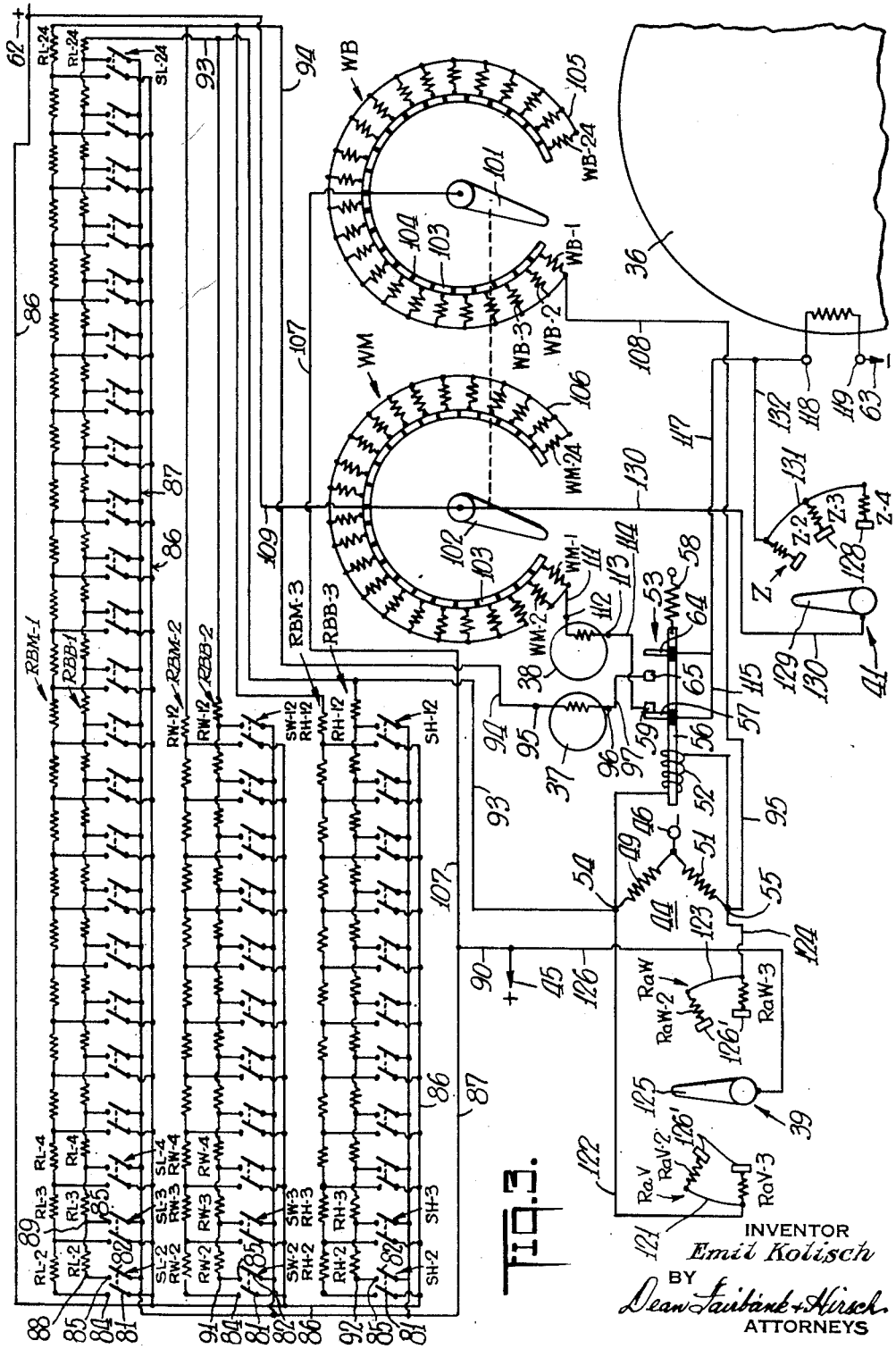

United States Patent Office 2,708,368
Patented May 17, 1955

2,708,368

EQUIPMENT FOR RATING BY VOLUME, WEIGHT, AND ZONE

Emil Kolisch, New York, N. Y., assignor to Continental Silver Co. Inc., Brooklyn, N. Y., a corporation of New York Application December 21, 1950, Serial No. 201,905

16 Claims. (Cl. 73—432)

In the rating of rectangular objects and packages, as for instance for determining transportation charges by air express, post office, express, truck or other delivery service organizations, either the weight or the volume of the object or package may be the determining factor for the shipping charge. Ordinarily the weight of the object forms the basis for such charge, but where the object has a relatively large volume and a small weight, as for instance, boxed flowers, some transportation services base their charge on volume.

Where, in order to determine the shipping charge, an object must be measured by rule or tape and the length, width and height multiplied to determine volume, whether with or without resort to multiplication tables, and the weight of the object must be separately determined by placing it on a weighing scale and the two values compared in order to determine which is the proper basis of charge, such operations are time-consuming, costly and subject to error. These difficulties are aggravated where, in order to encourage shipments of large volume objects that have relatively little weight, tables must be consulted to determine the abatement of charge allowable on the basis of the volume relative to weight.

It is accordingly among the objects of the invention to provide a relatively simple equipment, with relatively few moving parts not likely to become deranged, operated with the need for little supervision, automatically and speedily to rate rectangular objects according to volume or weight and (based on a predetermined relation between volume and weight, which relation may be varied at will), automatically to determine which of such ratings, whether for volume or for weight, will be the basis for shipment charge of such object and automatically to indicate such charge, without the need for manually measuring the object, consulting tables or doing calculations of any sort.

Another object is to provide an equipment by which such variation in the relation between volume and weight that automatically determines the basis of rating, whether for volume or for weight, is readily attained by a single, simple, manual adjustment.

Another object is to provide an equipment by which a multiplication factor may be introduced in the charge indicated, as for instance to introduce a zone factor for shipping charge and to accomplish this by a single, simple manual adjustment.

According to the invention, from its broader aspect, each of the three dimensions of length, width and height of the rectangular object is determined by the coaction of such object with suitable means, which automatically measures such parameters and determines the volume classification of such object. Simultaneously the weight classification of the object is determined by means of a suitable weighing scale on which the object may rest while determining the volumetric classification.

The classifications simultaneously effected of volume and weight are automatically correlated, according to the invention, in such manner that within a given range of relationship between volume and weight, the weight controls the charge rating desirably registered on a meter, while outside of that range the basis of the meter rating is automatically shifted for volume to be the controlling parameter.

In the illustrative embodiment of the invention shown in the drawings, the volume measuring portion of the rating equipment desirably comprises a frame presenting the three axes of a three dimensional system of rectangular coordinates to determine the length, width and height of the rectangular object brought into engagement therewith and the weight measuring portion comprises a weighing scale associated with said frame so that an object may be placed on said scale simultaneously with its engagement with the three axes of the rectangular coordinates, simultaneously to determine dimensions and weight.

Switches are arranged in sequence along the three axes of the rectangular coordinate system, of which only those that come within the dimensional range of the object being rated are actuated when the object is positioned in the frame. The actuation of such switches automatically places in circuit three banks of current limiting means or resistances correlated respectively with the three parameters being measured. By connecting the three banks of resistances in parallel, the output from such parallel circuits will be the sum of the currents therethrough. The resistances controlled by the switches along the three axes of the frame are so calibrated that the current therethrough is proportional to the logarithm of each dimension of the object being measured. Consequently, the sum of the currents through the three resistance banks connected in parallel will be proportional to the sum of such logarithms so that an anti-logarithmic scale on an appropriate electric indicating device or meter actuated by such combined current will indicate the product or volumetric rating of the object being measured, and of course can render such reading in monetary value as is ordinarily preferred.

Simultaneously with the metering of volume, the weighing scale is designed to place in circuit, current limiting means or resistances correlated with the weight of the object.

In one application in which the volume, determined in the above manner is correlated with weight to determine a reading which is a function of volume and weight, resistances are placed in circuit that pass current proportional to the weight of the object, then provided the constants are so selected that the weight controlled current is always greater than the volume controlled current, their difference will be proportional to the logarithm of the quotient of weight divided by volume and by means of a suitably calibrated antilogarithmic scale the density of the object may directly be read from an electric meter. Similarly if the volume controlled current is added to the weight controlled current the product of volume by weight could be read directly on such meter and as will be obvious to those skilled in the art any of a variety of other functions of volume and weight could be read by appropriate modifications of the various controlled resistances and calibrating constants of the meter.

An another application in which the reading is effected only by weight or only by volume, but in which the relation of weight to volume automatically determines the reading controlling factor, the current limiting means or resistances controlled by volume and those controlled by weight are so correlated that for corresponding numerical values in the volume sequence and the weight sequence, the currents passed thereby are equal. That is, for a given volume, a given weight is to have the same monetary rating and that relationship between volume and weight is proportionally maintained throughout the range of the equipment. To this end, a bank of resistances is controlled by the weighing scale and the magnitude of each resistance element in that bank is equal to the magnitude of resistance of the parallel connected resistances which determine the corresponding volume rating.

Of the two currents (weight controlled and volume controlled), that which preponderates, controls the reading of the meter and in the preferred embodiment, when the currents are equal, it is the weight current that controls the meter. To effect such control, it is preferred to connect the parallel connected volume resistances and the weight resistances in a suitable discriminator circuit, such as for example, a Wheatstone bridge, in which the volume resistances form one arm thereof and the weight resistance forms another arm thereof. A relay across such bridge is actuated by predominance, say of volume controlled current, to shift the connection for feeding volume controlled current to the meter, and the relay is biased to feed weight controlled current to such meter at all other times.

In order to insure correct readings on the rating meter, according to another feature of the invention, the rating meter is in a circuit separate and distinct from the bridge circuit, and such separate circuit includes sets of resistor banks, identical respectively to those heretofore described for volume and weight determination and the two sets of resistor banks are controlled by inter-related switches so that the resistance connected in circuit of both sets of resistor banks is in all respects identical at all times.

According to another feature, the predetermined relation of volume to weight previously mentioned may be varied by introducing into the bridge circuit (as for instance by setting a switch for the purpose), resistance in parallel with either the volume measuring or the weight measuring portion of the equipment which forms the arms of the bridge, correspondingly to increase the current flowing through that side of the bridge to which such resistance is added. The resistance is of such value that the current therethrough will be proportional to the logarithm of the factor by which it is desired to change the relation.

According to another feature, the charge indication on the rating meter may be multiplied by any given factor (as for instance for zone rating) by introducing into the meter circuit (as for instance by setting a switch for the purpose) a resistance in parallel with the volume or weight measuring portion of said circuit, said resistance being of such value that the current therethrough is proportional to the logarithm of such given factor.

The application is a continuation in part of copending application Serial No. 776,529, filed September 27, 1947, now Patent No. 2,630,043.

In the accompanying drawings in which are shown one or more of various possible embodiments of the several features of the invention, Fig. 1 is a perspective view of an illustrative equipment for rating rectangular objects, Fig. 2 is a simplified circuit diagram showing the principle of the invention, Fig. 3 is a more elaborate circuit diagram indicating the application of the principle of the invention in a substantially commercial embodiment thereof, and Fig. 4 is a fragmentary circuit diagram of another embodiment.

Before proceeding to a description of the circuits, an equipment with which the invention may be practiced, will be briefly described, purely for purpose of illustration.

The rating equipment will illustratively be described as suitable for rating by volume, objects up to a length of twenty-four units, height of twelve units and width of twelve units in increments of one unit, from two units up and for rating by weight objects up to one hundred and twenty units in increments of five units from five units up. The units of length, width and height may be centimeters, meters, inches, feet, yards or any arbitrary unit of length as desired, and the units of weight may be grams, ounces or pounds, or any arbitrary unit of weight as desired.

In Fig. 1 is shown a rectangular housing 20 which carries the various resistors, switches and meters used in the circuit hereinafter described. Extending parallel to the top surface 21 of the housing 20 is a substantially rectangular platform 22, desirably connected by rod 23 through said top 21 to conventional weighing scale mechanism (not shown) in the housing. The platform 22 desirably has a frame thereon which comprises rails 25 and 26 affixed to the top surface thereof and extending respectively along the front edge 27 and a side edge 28 thereof. An additional rail 29 is affixed at its lower end as by a hinge 30 to the forward end 31 of rail 25 so that in collapsed position rail 29 will rest on rail 25. Desirably rail 26 is double the thickness of each of rails 25 and 29 so that when rail 29 is moved to horizontal position for convenience in storage or transport, the top surfaces of rails 26 and 29 will lie in the same horizontal plane.

Each of the rails 25, 26 and 29 carries a sequence of control devices in the form of plungers 33, illustratively at intervals of one unit lengthwise of the rails, said rails having twenty-three, eleven, and eleven plungers thereon respectively, each of which controls a micro switch 34, normally in open position. The first plunger 33 in each of the rails is desirably spaced two units from the origin 35 of the three-rail coordinate system of the rating equipment, so that the smallest object that can be classified by the equipment is two units by two units by two units.

Thus, if a rectangular object is placed on platform 22 and is brought into contact, at the respective edges of one corner of the object, with rails 25, 26 and 29, it will depress those plungers 33 which are respectively engaged by its longitudinal, transverse and vertical dimensions to close the associated micro switches 34, while its weight will affect the weighing scale. The electrical circuit hereinafter described is affected by the closed micro switches (which are controlled by the dimensions) and by the weight of the object in order to determine the desired rating (whether according to volume or to weight) upon a meter 36 which desirably is calibrated in monetary units, such as in cents, automatically to register the charge or rating of the particular object.

If desired, the housing may also have a meter 37 indicating volume and a meter 38 indicating weight. The equipment may also have one or more additional control switches to introduce further factors that may be significant in determining the rating of the object. Thus, there is shown on housing 20 a manually operable control switch 39 designated a ratio switch, which serves to set up a predetermined relation between weight and volume in determining the rating. Moreover, there is shown a switch 41 designated the zone switch, which serves to multiply the basic charge or rating by a predetermined factor illustratively in accordance with the postal or other zone to which the object is to be transported.

Thus the meter 36 will indicate the amount to be charged for transportation of an object placed on the equipment, such charge to depend usually on weight. But in all such cases where the volume is to be the controlling factor, such volume rather than the weight, shall control the meter reading, which reading automatically takes into account also the ratio factor determined by switch 39 and the zone factor determined by switch 41, all of which will appear more clearly from the following description of the electrical circuits.

Referring now to the simplified circuit diagram in Fig. 2, there is shown a discriminator circuit, illustratively in the form of a Wheatstone bridge 44 supplied from a source of fixed potential 45 and 46. The arm 47 of the bridge is of variable resistance and illustratively comprises three resistor banks designated RBB-1, RBB-2, RBB-3, connected in parallel and of value to effect a combined current flow therethrough which is proportional to the logarithm of the volume of any object being rated. The arm 48 of the bridge is also of variable resistance and illustratively comprises a resistor bank WB of value to effect a current flow therethrough which is determined by the weight of the same object, which current (for a predetermined relation between volume and weight) is to be equal to the current through arm 47. Arms 49 and 51 of the Wheatstone bridge are desirably fixed resistances of equal value that serve to balance the bridge as readily understood.

The circuit shown in Fig. 2 is connected normally to effect a reading on the rating meter 36 which is based on the weight parameter, but has a switch, automatically to render the volume the parameter which effects the reading on the rating meter, under conditions where the volume becomes the predominant parameter upon which the rating is to be based. For this purpose the coil 52 of a polarized relay 53 illustratively of the type put out by Struthers, Dunn Co. of Philadelphia, Pa. and designated 59XAX, may be connected across points 54 and 55 of the Wheatstone bridge 44. The armature 56 of the relay carries a switch arm 57 normally urged by coil spring 58 against fixed contact 59 for normal connection to the rating meter 36 of a variable resistance WM identical with the resistance WB in the weight arm 48 of the Wheatstone bridge, but supplied from a source of potential 62, 63 different from that of the Wheatstone bridge.

The relay armature 56 also carries a second switch arm 64 normally disengaged from a corresponding fixed contact 65 and moved into engagement therewith upon energization of the relay coil 52 by a preponderating current through the volume arm 47 of the Wheatstone bridge. Upon such operation the circuit to resistance WM will be interrupted and instead a circuit will be completed to rating meter 36 through parallel connected volume resistor banks RBM-1, RBM-2 and RBM-3 identical with the resistances in the volume arm 47 of the Wheatstone bridge and supplied from the source of potential 62, 63.

It may be desirable to introduce a factor in determining the rating in order to give a greater or lesser rating significance to the volume with respect to the weight, than that for which the circuit is normally set. This is desirably accomplished by providing auxiliary resistances RaV and RaW. These auxiliary resistances RaV and RaW may be placed in series with the Wheatstone bridge arms 47 or 48, but it is preferred to place them in parallel with such arms respectively as indicated in Fig. 2 of the drawings. Each of these resistances RaV and RaW is normally out of circuit by reason of the normally open switch 39 associated therewith. Each of these resistances is of value such as to pass a current proportional to the logarithm of the factor which it is to introduce. Accordingly, if resistor RaW on the weight side is placed in circuit, a greater current will flow through point 55 with its two parallel connected resistances WB and RaW than otherwise. On the other hand, if the corresponding resistor RaV on the volume side were put in circuit a given volume will have correspondingly greater effectiveness in operating the relay 53 or, stated another way, the weight will have correspondingly less effectiveness.

In addition, an adjustable resistance Z in the meter circuit, is so connected that it may be placed in parallel with either volume resistor banks RBM-1, RBM-2 and RBM-3 or weight resistor WM to increase the current through the rating meter 36 by a predetermined multiple, in order to give a direct reading for various zones. This resistance Z, which is placed in circuit by the closing of switch 41, is of magnitude to pass a current proportional to the logarithm of the rating multiplier introduced, so that the anti-logarithmic scale on the rating meter 36 will show the product of the rating charge caused by the weight or volume as the case may be by the zone multiplier.

The resistors in the volume arm 47 of the Wheatstone bridge and the corresponding resistors RBM-1, RBM-2 and RBM-3 in the rating meter circuit are controlled in unison as are also the resistor in the weight arm 48 of the Wheatstone bridge and the corresponding resistor WM in the rating meter circuit thereof. Accordingly, the resistors of each of such pairs will have the same effective value, depending on the volume or weight as the case may be of the object.

In the light of the foregoing description, the more detailed illustrative circuit of Fig. 3 shown in order to assure compliance with statutory requirements and now to be described will be more readily understood.

As shown in Fig. 3 in which the reference numerals correspond to those of Fig. 2, there are illustratively 23 resistors in bridge resistor bank RBB-1 and 11 resistors in each of resistor banks RBB-2 and RBB-3, the resistors in each bank being connected in series and designated RL-2 to RL-24, to determine length, RW-2 to RW-12 to determine width and RH-2 to RH-12 to determine height. The resistors of meter resistor banks RBM-1, RBM-2 and RBM-3 are respectively of identically the same values. The twenty-three micro switches 34 mounted on rail 25 (designated SL-2 to SL-24), the eleven micro switches 34 mounted on rail 26 (designated SW-2 to SW-12) and the eleven micro switches 34 mounted on rail 29 (designated SH-2 to SH-12) each has a pair of movable switch arms 81 and 82 insulated from each other and ganged together to move in unison upon actuation of the associated plunger 33. Each switch arm 81 and 82 has a corresponding fixed contact 84 and 85 respectively and is normally spaced therefrom. The switch arms 81 of all of the micro switches 34 on rails 25, 26 and 29 are connected together by common lead 86 and the switch arms 82 of all of the micro switches on said rails 25, 26 and 29 are connected by common lead 87. The end 88 of resistor RL-2 of resistor bank RBB-1 is connected to contact 85 of micro switch SL-2, the end 89 of resistor RL-3 is connected to contact 85 of micro switch SL-3 and so on. Similarly the end 91 of resistor RW-2 of resistor bank RBB-2 is connected to contact 85 of micro switch SW-2 and the end 92 of resistor RH-2 is connected to contact 85 of micro switch SH-2 and so on. In like manner the resistors of resistor banks RBM-1, RBM-2 and RBM-3 are connected to the fixed contacts 84 of said micro switches 34 on rails 25, 26 and 29.

The ends of resistor banks RBB-1, RBB-2 and RBB-3 are connected by common lead 93 to point 54 of the Wheatstone bridge 44 and the common lead 87 of micro switches 34 is connected by lead 90 to the source of positive potential 45. The common lead 86 of micro switches 34 is connected to the second source of positive potential 62 and the ends of resistor banks RBM-1, RBM-2 and RBM-3 are connected by common lead 94 to the terminal 95 of meter 37, which desirably has an anti-logarithmic scale, the terminal 96 of said meter being connected by lead 97 to fixed contact 65 of switching relay 53, said contact 65 as previously pointed out being normally spaced from contact 64 carried by armature 56 of said relay 53.

The weighing scale suggested in Fig. 1 desirably controls through conventional linkage, movable switch arms 101 and 102 of the resistor banks WB and WM respectively, which arms are ganged to move in unison. Each of the resistor banks WB and WM desirably comprises a plurality of resistors illustratively 24 in number and designated respectively WB-1 to WB-24 inclusive and WM-1 to WM-24 inclusive, each associated with a given weight. The resistor banks WB and WM are so arranged that upon rotation of the movable switch arms 101 and 102 by the weight of an object placed upon platform 22 only one of the resistors of each of the resistor banks WB and WM will be in circuit.

To this end, as shown in Fig. 3, the ends of the movable switch arms 101 and 102 are arranged so as to move in an arcuate path in contact with a plurality of arcuate contacts 103 illustratively 24 in number, the contacts 103 being insulated from each other as at 104 and electrically connected respectively to one end of each of the resistors WB–1 to WB–24 and WM–1 to WM–24. The other end of each of the resistors in each of the resistor banks WB and WM are connected by common leads 105 and 106 respectively. The movable switch arm 101 is connected by leads 107 and 90 to positive power main 45 and the common lead 105 of resistor bank WB is connected by lead 108 to point 55 of the Wheatstone bridge 44.

The movable contact arm 102 of resistor bank WM is connected to positive main 62 by lead 109 and the common lead 106 of such resistor bank is connected by lead 111 to terminal 112 of meter 38 which also desirably has an anti-logarithmic scale and thence from terminal 113 of said meter by lead 114 to fixed contact 59 of relay 53.

The contact 59 which is normally engaged by contact 57 carried by armature 56 is movable away therefrom when coil 52 of relay 53 is energized, the movement of the armature at such time also bringing contacts 64 and 65 into engagement. As shown in Fig. 3, the contacts 57 and 64 are connected by lead 115 which in turn is connected by lead 117 to terminal 118 of meter 36, the other terminal 119 of which is connected to negative main 63.

The resistor banks RaV and RaW associated with ratio switch 39 shown in Fig. 1, each desirably comprises a plurality of resistors, only two of which are shown in Fig. 3, resistors RaV–2 and RaV–3 being at the left and resistors RaW–2 and RaW–3 being at the right. The RaV resistors are connected by lead 121 and lead 122 to point 54 on the volume side of the Wheatstone bridge 44, while the RaW resistors are connected by leads 123 and 124 to point 55 on the weight side of the Wheatstone bridge. Thus when arm 125 of ratio switch 39, which is connected to positive main 45 by lead 126, is thrown to the left to engage the terminal 126' of any of the RaV resistors, that resistor is connected in parallel with the three parallel connected resistance banks RBB–1, RBB–2 and RBB–3 of the volume bank, and when said switch arm 125 is thrown to the right to engage the terminal 126 of any of the RaW resistors, that resistor is connected in parallel with the resistor bank WB.

The zoning resistor bank Z shown in Fig. 3 desirably comprises a plurality of resistors, three of which are shown and indicated as Z–2, Z–3 and Z–4, the terminals 128 of which may be selectively engaged by the switch arm 129 of switch 41, which is connected by leads 130 and 109 to the positive main 62. Resistors Z–2, Z–3 and Z–4 are electrically connected at their other terminals at 131 and through lead 132 are connected to the terminal 118 of the rating meter 36, the other terminal 119 of which is connected to negative main 63.

*Determination of resistor magnitudes*

Illustrative values will not be determined for the resistor sections of the two identical sets of resistor banks RBB–1, RBB–2 and RBB–3 and RBM–1, RBM–2 and RBM–3 of the equipment shown in Fig. 3 and above described, on the assumption that a line voltage of 110 volts D. C. is utilized.

If the current passing through each of the resistor banks RBB–1, RBB–2 and RBB–3 for example, is proportional to the logarithm of the corresponding dimension classification the sum of the currents through each of the resistor banks will be of such value that the antilogarithm thereof (to be read as such or with corresponding monetary value on meter 36) will equal the product of the three dimensions or the volume classification of the object.

As appears in Tabulation I hereinafter set forth, the second column is the logarithm (to two decimal places) of each of the dimensional values from 2 to 24 in the first column headed classification. For convenience in calculations, the third column will be the logarithm multiplied by 100 and considered as milliamperes and the resistances, in the fourth column are readily determined from Ohm's law by dividing the impressed voltage of 110 by the current in milliamperes.

TABULATION I

| Classification | Logarithm | Current in Milli-amperes | Resistance in Ohms required in Circuit |
|---|---|---|---|
| 2 | 0.30 | 30 | 3,666 |
| 3 | 0.48 | 48 | 2,292 |
| 4 | 0.60 | 60 | 1,833 |
| 5 | 0.70 | 70 | 1,571 |
| 6 | 0.78 | 78 | 1,410 |
| 7 | 0.85 | 85 | 1,294 |
| 8 | 0.90 | 90 | 1,222 |
| 9 | 0.95 | 95 | 1,158 |
| 10 | 1.00 | 100 | 1,100 |
| 11 | 1.04 | 104 | 1,057 |
| 12 | 1.08 | 108 | 1,019 |
| 13 | 1.11 | 111 | 991 |
| 14 | 1.15 | 115 | 956 |
| 15 | 1.18 | 118 | 932 |
| 16 | 1.20 | 120 | 916 |
| 17 | 1.23 | 123 | 894 |
| 18 | 1.26 | 126 | 874 |
| 19 | 1.28 | 128 | 860 |
| 20 | 1.30 | 130 | 846 |
| 21 | 1.32 | 132 | 834 |
| 22 | 1.34 | 134 | 821 |
| 23 | 1.36 | 136 | 809 |
| 24 | 1.38 | 138 | 797 |

It will of course be understood that the current values may be read in amperes directly from the logarithms or in any other unit to afford resistances in any desired range of values that prove to be practical, and the scale on the rating meter would be correspondingly calibrated as readily understood.

From Tabulation I it can be seen that for an object having a length of two units and which will close micro switch SL–2 to cause a current flow of 30 ma., 3,666 ohms must remain in the circuit. Thus the total value of the twenty-three series connected resistances RL–2 to RL–24 in the length resistor bank RBB–1 must equal 3,666 ohms. If the length of the object is three units, from Tabulation I we see that there must be 2,292 ohms in circuit in order to give the desired current reading of 48 ma. It is therefore necessary that when micro switch SL–3 is closed by such object three units in length, only 2,292 ohms remain in circuit. However, as we have seen that with micro switch SL–2 closed, 3,666 ohms are in circuit, it will be necessary by the closing of micro switch SL–3 to remove 1,374 ohms from the circuit. Thus, resistor RL–2, which is short circuited by the closing of micro switches SL–2 and SL–3 must have a value of 1,374 ohms. For an object four units in length which requires 1,833 ohms in circuit for a current flow of 60 ma. as we have already removed 1,374 ohms from the circuit by the closing of micro switch SL–3, we need only remove 459 ohms more to have the required resistance of 1,833 ohms in circuit and hence resistor RL–3 which is short circuited by the closing of micro switch SL–4 is 459 ohms.

In a similar manner the value of the remaining resistors in resistor bank RBB–1 may be determined as may the values of the resistors in resistor banks RBB–2 and RBB–3 and the following tabulations may be made:

TABULATION II

|  | Resistance in Ohms |
|---|---|
| RL–2 | 1,374 |
| RL–3 | 459 |
| RL–4 | 262 |
| RL–5 | 161 |
| RL–6 | 116 |
| RL–7 | 72 |
| RL–8 | 64 |
| RL–9 | 58 |

TABULATION II—Continued

| | Resistance In Ohms |
|---|---|
| RL-10 | 43 |
| RL-11 | 38 |
| RL-12 | 28 |
| RL-13 | 34 |
| RL-14 | 24 |
| RL-15 | 16 |
| RL-16 | 22 |
| RL-17 | 20 |
| RL-18 | 14 |
| RL-19 | 14 |
| RL-20 | 12 |
| RL-21 | 13 |
| RL-22 | 12 |
| RL-23 | 12 |
| RL-24 | 797 |

TABULATION III

| | Resistance in Ohms |
|---|---|
| RH-2—RW-2 | 1,374 |
| RH-3—RW-3 | 459 |
| RH-4—RW-4 | 262 |
| RH-5—RW-5 | 161 |
| RH-6—RW-6 | 116 |
| RH-7—RW-7 | 72 |
| RH-8—RW-8 | 64 |
| RH-9—RW-9 | 58 |
| RH-10—RW-10 | 43 |
| RH-11—RW-11 | 38 |
| RH-12—RW-12 | 1,019 |

With resistors having values thus determined, the total current flow through the parallel connected resistor banks RBB-1, RBB-2 and RBB-3 will be proportional to the logarithm of the product of the dimensions, i. e., to the volume being measured. Thus, for example if the unit of measurement is considered to be inches, if an object twelve inches by twelve inches by two inches is being measured, the current flow through resistor banks RBB-1, RBB-2 and RBB-3 respectively will be 108 ma., 108 ma. and 30 ma. or a total of 246 ma., which is proportional to the logarithm of the volume of the object. From a table of logarithms the anti-logarithm of 2.46 is read as 288, the corresponding product which is the volume of the object that will be read as such or in corresponding monetary value upon the meter 36 which is illustratively calibrated in cents in increments of five.

In order to determine the values of the weight resistor banks WB and WM let it be assumed that 28.8 cubic inches of volume shall have the same rating as one pound of weight. Then with the circuit shown, weight will determine the rating whenever the object has a volume of 28.8 cubic inches or less for each pound of weight. Whenever this relation is achieved by the volume and the weight of an object, the contacts 57 and 59 of the relay 53 remain in engagement. But when an object is being rated which has a volume of more than 28.8 cubic inches for one pound of weight, contacts 57 and 59 will disengage to disconnect weight resistor bank WM and the contacts 64 and 65 of the relay will be moved into engagement to switch the output of volume resistor banks RBM-1, RBM-2 and RBM-3 to meter 36.

More specifically, as the coil 52 of relay 53 is connected across the bridge 44 to points 54 and 55, it is apparent that when the current through the volume arm RBB-1, RBB-2 and RBB-3 of the bridge is equal to the current through the weight arm WB, the bridge will be balanced and no current will flow through coil 52. Hence contacts 57 and 59 will remain in engagement due to the spring 58 so that the resistor bank WM will be connected to meter 36.

If the current through the weight arm of the bridge should be greater than that through the volume arm, the bridge will be unbalanced and current will flow through coil 52. However, as the armature 56 of the relay is polarized and positioned so that such current will flow in direction not to move said armature, contacts 57 and 59 will remain in engagement and volume resistor bank WM will remain connected to meter 36.

If, however, the current flowing through the weight arm WB of the bridge should be less than the current flowing through the volume arm thereof, the bridge also will be unbalanced, but the current flowing through coil 52 will flow in the opposite direction. As a result polarized armature 56 will move to disconnect contacts 57 and 59 and connect contacts 64 and 65 to disconnect weight resistor bank WM and to connect volume resistor banks RBM-1, RBM-2 and RBM-3 in circuit with meter 36.

For the purpose of illustration, if we assume that the object has a volume of 288 cubic inches, the weight must be ten pounds in order that the desired relation of 28.8 cubic inches to one pound be maintained. For a volume of 288 cubic inches, 246 ma. of current will flow in the volume resistor banks RBB-1, RBB-2 and RBB-3. It is therefore necessary that for the bridge to be balanced when the weight of the object is ten pounds, 246 ma. must flow through the weight resistor bank WB. At 110 volts this will require that resistor WB-2 which is associated with the ten pound indication of the scale be 448 ohms.

Accordingly, the following tabulation will show the resistance required in the weight banks for typical values when the rating for 28.8 cubic inches equals that for one pound.

TABULATION IV

| Volume in Cubic Inches | Weight in Pounds | Current in Milli-amperes | Value in Ohms | |
|---|---|---|---|---|
| 144 | 5 | 216 | WB-1, WM-1 | 511 |
| 288 | 10 | 246 | WB-2, WM-2 | 448 |
| 432 | 15 | 264 | WB-3, WM-3 | 417 |
| 576 | 20 | 276 | WB-4, WM-4 | 399 |
| 720 | 25 | 286 | WB-5, WM-5 | 385 |
| 864 | 30 | 294 | WB-6, WM-6 | 374 |
| 1,008 | 35 | 301 | WB-7, WM-7 | 365 |
| 1,152 | 40 | 306 | WB-8, WM-8 | 360 |
| 1,296 | 45 | 311 | WB-9, WM-9 | 354 |
| 1,440 | 50 | 316 | WB-10, WM-10 | 348 |
| 1,584 | 55 | 320 | WB-11, WM-11 | 344 |
| 1,728 | 60 | 324 | WB-12, WM-12 | 340 |
| 1,872 | 65 | 327 | WB-13, WM-13 | 337 |
| 2,016 | 70 | 331 | WB-14, WM-14 | 332 |
| 2,160 | 75 | 334 | WB-15, WM-15 | 329 |
| 2,304 | 80 | 336 | WB-16, WM-16 | 327 |
| 2,448 | 85 | 339 | WB-17, WM-17 | 324 |
| 2,592 | 90 | 342 | WB-18, WM-18 | 322 |
| 2,736 | 95 | 344 | WB-19, WM-19 | 320 |
| 2,880 | 100 | 346 | WB-20, WM-20 | 318 |
| 3,024 | 105 | 348 | WB-21, WM-21 | 316 |
| 3,168 | 110 | 350 | WB-22, WM-22 | 315 |
| 3,312 | 115 | 352 | WB-23, WM-23 | 313 |
| 3,456 | 120 | 354 | WB-24, WM-24 | 311 |

When a greater volume than the illustrative 28.8 cubic inches is to have a rating equal to one pound of weight, as for example, when twice that volume or 57.6 cubic inches is to have the same rating as one pound it is merely necessary appropriately to increase the current flowing to point 55 or the weight portion of the bridge for balance.

Referring to Tabulation IV to set up the equipment so that the bridge will balance when the volume is 576 (rather than 288) cubic inches and the weight is 10 pounds, it is merely necessary to add resistance in parallel with the weight arm of the bridge so that the current flow would be that caused by a weight of 20 pounds. As it is desired to multiply the weight by two it is merely necessary to add a resistance in parallel, the value of which will produce a current which is proportional to the logarithm of two. From Tabulation I it appears that the required resistance, R$a$W-2 is 3,666 ohms. That resistance connected in parallel with the weight resistance of 448 ohms increases the current flow to point 55 to 276 ma. Similarly, if it is desired to change the ratio to 86.4 cubic inches to one pound, it is merely necessary to multiply by three and the value of resistor R$a$W-3 to effect current flow proportional to the logarithm of three is 2,292 oms.

Where a lesser volume than the illustrative 28.8 cubic inches is to have a rating equal to one pound of weight, as for example, where up to but not including twice the weight or two pounds is to have the same rating as 28.8 cubic inches, it is merely necessary appropriately to increase the current flowing to point 54 or the volume side of bridge for balance.

This may be accomplished by adding resistance in parallel with the volume arm of the bridge to increase the current to point 54 and the values of such resistors R$a$V–2 and R$a$V–3 are identical with the respective resistors R$a$W–2 and R$a$W–3, i. e., 3,666 ohms and 2,292 ohms respectively.

As previously pointed out, the meter 36 has an antilogarithmic scale calibrated to read the charge in cents or other monetary units. Assuming that a charge of one cent is made for every pound or for every 28.8 cubic inches, the meter will read 10 cents when the object weighs 10 pounds or has a volume of 288 cubic inches.

The following tabulation of charges based on volume and weight may be made:

TABULATION V

| Volume in Cubic Inches | Weight in Pounds | Charge in Cents |
|---|---|---|
| 3,456 | 120 | 120 |
| 3,312 | 115 | 115 |
| 3,168 | 110 | 110 |
| 3,024 | 105 | 105 |
| 2,880 | 100 | 100 |
| 2,736 | 95 | 95 |
| 2,592 | 90 | 90 |
| 2,448 | 85 | 85 |
| 2,304 | 80 | 80 |
| 2,160 | 75 | 75 |
| 2,016 | 70 | 70 |
| 1,872 | 65 | 65 |
| 1,728 | 60 | 60 |
| 1,584 | 55 | 55 |
| 1,440 | 50 | 50 |
| 1,296 | 45 | 45 |
| 1,152 | 40 | 40 |
| 1,008 | 35 | 35 |
| 864 | 30 | 30 |
| 720 | 25 | 25 |
| 576 | 20 | 20 |
| 432 | 15 | 15 |
| 288 | 10 | 10 |
| 144 | 5 | 5 |

If the charges to be made are based on zones and the basic charge for a ten pound package of volume of 288 cubic inches or less in zone 1 is ten cents, which charge is to be doubled for zone 2, trebled for zone 3, etc., it is a relatively simple mater so to indicate this charge directly on the meter 36. For this purpose the resistor Z–2 may be connected in parallel with the parallel connected resistor banks RBM–1, RBM–2 and RBM–3 or with resistor bank WM as the case may be, upon movement of switch arm 129. Resistor Z–2 has such value that when in circuit the current through the meter 36 will be increased by an amount which is proportional to the logarithm of two. Thus, resistor Z–2 has a value of 3,666 ohms, so that for example, if the object weighs 10 pounds, the resistance of resistor bank WM as shown in Tabulation IV is 448 ohms. When 3,666 ohms is placed in parallel with 448 ohms the resultant resistance of the parallel circuit is equal to 399 ohms which will produce a current at 110 volts of 276 ma. which from Tabulation IV indicates 576 cubic inches or 20 pounds, which from Tabulation V will indicate 20 cents on the meter. Similarly, if the package is to be sent into a third or fourth zone where the rate is three or four times as much, resistors Z–3 and Z–4 may have a value of 2,292 ohms and 1,833 ohms respectively which will result in a current flow in the meter to give a reading of 30 cents or 40 cents respectively.

Operation

When an object twelve inches by twelve inches by two inches, for example, is placed on the platform 22 of the weighing scale so that it abuts against rails 25, 26 and 29 with the corner of the object at the origin 35 of the platform, micro switch SL–2 to SL–12 will be closed as will micro switches SW–2 to SW–12 and micro switch SH–2. If the object weighs ten pounds, for example, ganged switch arms 101 and 102 will move into engagement with the fixed contacts 103 connected to the resistors WB–2 and WM–2 associated with the 10 pound indication. The closing of micro switches SL–12, SW–12 and SH–2 will short circuit resistors RL–2 to RL–11, RW–2 to RW–11 and complete a path through resistors RH–2 to RH–12. As a result, a circuit will be completed from the source of power 45, lead 90 to the common lead 87 connected to the movable switch arms 82 of the micro switches associated with resistor banks RBB–1, RBB–2 and RBB–3, through such switch arms 82 and fixed contacts 85 and thence through resistors RL–12 to RL–24, resistor RW–12 and resistors RH–2 to RH–12 to common lead 93 which is connected to point 54 of bridge 44.

As the resistors RL, RW and RH are in parallel the resultant current which will flow through the point 54 of the bridge 44 and resistor 49 to negative main 46 will be 246 ma. Similarly the same amount of current will flow through from positive main 62, land 86 through resistor banks RBM–1, RBM–2 and RBM–3, common lead 94 and meter 37 to fixed contact 65 of relay 53 when the contact 65 is connected in circuit.

With the weight of ten pounds on platform 22 current will flow through resistor WB–2 which has a value of 448 ohms so that a current of 246 ma. will flow therethrough. The current is from positive main 45, through leads 90 and 107, movable contact arm 101, resistor WB–2, common lead 105 and lead 108 to point 55 of the bridge.

Similarly, the same amount of current will flow through positive main 62, lead 109, contact arm 102, resistor WM–2, leads 106 and 111 through meter 38 and lead 114 to fixed contact 59 of relay 53 which is engaged by movable arm 57, thence through leads 115, 117 and meter 36 to negative main 63.

As the currents applied to points 54 and 55 of the bridge are identical the bridge will be in balance and hence no current will flow through the coil 52 of relay 59. As a result movable contact 57 thereof will remain in engagement with fixed contact 59. The 246 ma. of current flowing through meter 36 and through meter 38 will cause a reading of ten cents to be effected on meter 36 and ten pounds on meter 38.

If the object should have a volume of 288 cubic inches and the weight should be, for example, 20 pounds, the current flowing to point 54 of the bridge will be 246 ma. as previously described. The current through resistor WB–4 which will be in circuit at a weight of 20 pounds, to point 55 of the bridge will be 276 ma. As a result the bridge will be unbalanced and current will flow through coil 52 of relay 53 which is connected across points 54 and 55. However, as the armature 56 is polarized in manner so that it will not move when the weight current preponderates, contacts 57 and 59 will remain in engagement. Consequently, 276 ma. of current will flow from positive main 62 through resistor WM–4 and through meters 38 and 36 as previously described so that meter 38 will indicate 20 pounds and meter 36 will indicate 20 cents.

If the object being measured should be twelve inches by twelve inches by four inches or 576 cubic inches and the weight should be 10 pounds, the current flowing to point 54 of the bridge due to parallel resistor banks RBB–1, RBB–2 and RBB–3 will be 276 ma., whereas the current at point 55 of the bridge from resistor WB–2 will be 246 ma. As a result, the bridge will be unbalanced and current will flow through coil 52 in direction to draw the polarized armature 56 to the left as shown in Fig. 3. Consequently, movable contact 57 will be disconnected from fixed contact 59 and a movable contact 64 will engage fixed contact 65. As a result a current of 276 ma. will flow from positive main 62 through resistor banks RBM–1, RBM–2 and RBM–3, lead 94 through meter 37 to fixed contact 65 of relay 53, through movable contact 64, leads 115 and 117 and meter 36 to negative main 63. The resultant reading on meter 37 will be 576 cubic inches and on meter 36 will be twenty cents.

The operation thus far described has been with respect to the predetermined relation of 28.8 to one with a charge of one cent for each 28.8 cubic inches or each pound. Where it is desired to allow the shipper to transport double the volume for a given weight for the same price, that is, 57.6 cubic inches for one cent, it is merely necessary to move switch arm 125 so that it engages contact 126′ associated with resistor RaW–2 which has a value of 3,666 ohms, to put the latter in parallel with the resistors in the resistor bank WB.

Thus, for example, if the volume is 576 cubic inches and the weight is ten pounds, the current through resistor banks RBB–1, RBB–2 and RBB–3 to point 54 of the bridge as previously pointed out will be 276 ma. Resistor RaW–2 will be in parallel with resistor WB–2 of the resistor bank WB, the circuit being from positive main 45 to which the movable arm 101 of resistor bank WB is connected by lead 107 and to which the movable arm 125 of switch 39 is connected by lead 126 through resistor RaW–2 which is connected by leads 123 and 124 to point 55 of the bridge to which resistor WB–2 is also connected as by lead 108. Thus, 3,666 ohms will be in parallel with 448 ohms so that the total resistance will be 399 ohms and 276 ma. will also flow to point 55. Consequently the bridge will remain balanced when the volume of the object is 576 cubic inches and its weight is ten pounds. With the bridge in balance no current will flow through coil 52 and the circuit previously described will be completed through resistor WM–2 and meters 38 and 36 and as 246 ma. will flow through said meters they will indicate only ten pounds and ten cents respectively.

If the volume should be greater than 576 cubic inches, such as for example, 720 cubic inches, and the weight should still be ten pounds with the ratio switch arm 125 still engaging the contact 126′ associated with resistor RaW–2, 286 ma. will flow to point 54 of the bridge thereby unbalancing the bridge in the manner previously described so that the resistor banks RBM–1, RBM–2 and RBM–3 will be placed in series with the meters 37 and 36 and a current of 286 ma. will flow through such meters to give a volume indication of 720 cubic inches and a charge of twenty-five cents respectively.

Similarly, if it is desired to allow the shipper to transport up to but not including double the weight for a given volume for the same price, that is, up to but not including two pounds for one cent with a relation such as 28.8 to 2, between volume and weight, it is a simple matter to move movable contact arm 125 of ratio switch 39 to engage fixed contact 126′ to place resistor RaV–2 in parallel with the volume resistor banks RBB–1, RBB–2 and RBB–3. The circuit is from positive main 45, lead 126 to movable arm 125, through resistor RaV–2 to common lead 121 and thence to point 54 and from positive main 45, leads 90 and 87 to resistor banks RBB–1, RBB–2 and RBB–3 and from common lead 93 to point 54. The addition of resistor RaV–2 which has a value of 3,666 ohms, in parallel with the resistance of parallel connected resistor banks RBB–1, RBB–2 and RBB–3 which have a combined value of 448 ohms for 288 cubic inches will give a resultant resistance of 399 ohms so that the 276 ma. will flow to point 54 of the bridge to overcome the 264 ma. flowing through the weight arm of the bridge due to a weight of over 15 pounds but less than 20 pounds on the scale, which places resistor WB–3 in circuit. Consequently the relay will be energized to switch resistor banks RBM–1, RBM–2 and RBM–3 in circuit and as a current of 246 ma. is flowing through such resistors a charge of but ten cents will be indicated on meter 36, even though the weight of the object is, for example, 19 pounds.

In the event, however, an object being rated should have a relation between volume and weight equal to or greater than 28.8 to 2 the bridge will be balanced when the relation is equal to 28.8 to 2 or unbalanced in favor of weight when the relation is changed, i. e., to 28.8 to 3. In either case, the weight resistors WM will be in circuit as previously described and the charge on meter 36 will indicate 20 or 30 cents as the case may be based on the weight of the object.

With the zoning switch 41 in the position shown in Fig. 1 the current flow through the charge meter 36 will depend solely upon the current flowing through either the volume resistor banks RBM–1, RBM–2 and RBM–3 or the weight resistor bank WM, whichever is in circuit. If, for example, the weight resistor bank is in circuit and a weight of ten pounds is producing a current of 246 ma. through the meter, a reading of ten cents will be given. If it is desired to double the rate in the event that the package is to be shipped to a second zone further away, it is a relatively simple matter to move switch arm 129 of zone switch 41 to engage contact 128 associated with resistor Z–2 so that the latter will be put in parallel with resistor WM–2. The circuit is from one end of resistor Z–2 to terminal 118 of meter 42 to which one end of resistor WM is connected, and from the other end of resistor Z–2 through movable contact arm 129 and lead 130 to switch arm 102 of resistor bank WM, which is connected to the one end of resistor WM–2. As resistor Z–2 has a value of 3,666 ohms and resistor WM–2 has a value of 448 ohms the resultant resistance will be 399 ohms so that 276 ma. will flow through meter 36 to indicate a charge of twenty cents. Similarly the charge may be multiplied by 3, 4 or other factors as desired.

By means of the equipment above set forth, the rating of objects may be determined in rapid sequence upon meter 36 as may also, if desired, the volume of each object on meter 37 and its weight on meter 38. With equipment of appropriately large dimensions, the rating, volume or weight of a generally rectangular stack or pile or collection of articles may be determined as a group in one operation. After each object or group of objects is removed from the platform 22, the equipment becomes automatically cleared by the return of the micro switches 34 and the scale platform 22 to neutral position in readiness for rating the next object or group of objects.

Where volume is to be the sole factor to be determined, the weight controlled instrumentalities and the discriminator circuit may of course be omitted, the reading then being determined solely by the logarithms of the combined currents flowing, due to the actuation of the micro switches 34 on the rails 25, 26 and 29, which arrangement is within the scope of the broader claims herein. Likewise where merely the area of any face of such object is to be determined, the circuit to the rail controlling the superfluous dimension need merely be disconnected.

In Fig. 4 is shown an application of the generic principle above set forth for ascertaining a function of volume and weight, illustratively the density of rectangular objects.

In the circuit of Fig. 4, a Wheatstone bridge 44′ is shown, generally similar to that of Figs. 2 and 3 and corresponding parts of which have the same reference numerals primed. Arm 47′ of the bridge is identical with that of Figs. 2 and 3 with resistors in parallel, respectively, to pass current, each proportional to the logarithm of the corresponding dimension of the object. Instead of the relation of weight to volume employed in the embodiment of Figs. 2 and 3, the weight arm 48′ of the bridge 44′ is of resistance that will pass a current directly proportional to the logarithm of the weight of the object which may be determined on the weighing scale of Fig. 1.

The currents proportional to the logarithm of volume and weight, respectively, may be correlated or combined in any of numerous possible manners for ascertaining the value of a predetermined function of volume and weight.

Specifically for determining the density of an object, the weight is determined in units such that the current through the weight arm must always be greater than the current through the volume arm, even though the object measured has the smallest weight and the largest volume within the scope of the equipment. The current across the bridge from 55' to 54' is passed through meter 50. Meter 50 thus passing the difference between the logarithmic magnitudes of current through the weight arm 48' and the volume arm 47', registers current proportional to the quotient of the weight divided by the volume. Accordingly, an anti-logarithmic scale appropriately calibrated to compensate for the constants introduced will directly read the density of the object.

It will of course be understood that the circuit arrangement of Fig. 4 for the purpose of determining density or other combined function of volume and weight can be incorporated in the unit of Fig. 1 with the arrangement shown in the circuit of Figs. 2 and 3 and that the elements which the circuits of Figs. 2 and 3 have in common with that of Fig. 4 would not have to be duplicated in such combined equipment in which of course there would be provided an additional meter for reading density and an additional switch for setting into circuit either the density meter or the rate meter and the corresponding circuit elements of Figs. 2 and 3 or Fig. 4, respectively.

While the system above described has been shown to select either the weight or volume of an object and charge for the same, it is within the scope of the invention to provide circuits which will, for example, when the volume is much greater than the weight, automatically charge not for the entire volume, but only for a predetermined percentage of such volume. Equipment of this type may utilize standard vacuum tubes and associated components selected in manner so to function.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention what I claim as new and desire to secure by Letters Patent of the United States is:

1. Equipment for rating objects according to volume, comprising circuit control means responsive to the respective dimensions of an object being rated, current limiting means under control of the respective control means and each of magnitude to pass a current proportional to the logarithm of the corresponding dimension of such object, said current limiting means being connected in parallel to pass a combined current proportional to the logarithm of the volume of such object, and an electric indicating device in series with said parallel connected current limiting means and having a response that bears an anti-logarithmic relation to the current flow therethrough.

2. The combination recited in claim 1 in which there is a resistor of magnitude to pass a current proportional to the logarithm of a multiplier, and a manually operated switch serves to connect said resistor when desired in parallel with the parallel connected current limiting means.

3. The combination recited in claim 1 in which the equipment comprises a frame having the three axes of a coordinate system for simultaneous engagement by the edges at one corner of a rectangular object being rated, each of such axes having a sequence of switches that constitute the circuit control means for determining the volume.

4. Equipment for rating objects, comprising circuit control means responsive to the respective dimensions of an object being rated, current limiting means under control of the respective control means, and each of magnitude to pass a current proportional to the logarithm of the corresponding dimension of such object, said current limiting means being connected in parallel to pass a combined current proportional to the logarithm of the volume of such object, a weighing scale, circuit control means responsive to the weight of such object, current limiting means under control of the latter control means, said two current limiting means being correlated so that for corresponding sequences of numerical values of volume and weight, the currents passed by the respective current limiting means are equal, an electric indicating device having a response that has an anti-logarithmic relation to the current flow therethrough, and means responsive to the relative currents in the respective current limiting means, selectively to pass through the electric indicating device a current equal to that through one or the other of said current limiting means.

5. The combination recited in claim 4 in which the equipment comprises a frame having the three axes of a coordinate system for engagement by the edges at one corner of a rectangular object being rated, each of such axes having a sequence of switches that constitute the circuit control means for determining the volume and in which the weighing scale supports the object that is in engagement with the frame.

6. The combination recited in claim 4 in which the volume controlled and the weight controlled current limiting means are correlated in a discriminator circuit, which determines the control of the electric indicating device by volume or weight depending on which factor predominates in such discriminator circuit.

7. The combination recited in claim 6 in which the discriminator circuit is a Wheatstone bridge, one arm of which is the volume controlled current limiting means, a second arm of which is the weight controlled current limiting means, and a relay across said bridge actuated by unbalance in said arms serves selectively to control the flow to the electric indicating device, of current equal to that through one or the other of the current limiting means.

8. The combination recited in claim 4 in which the current limiting means are resistances, the three parallel connected resistances that determine the volume constitute one arm of a Wheatstone bridge, the resistance that determines weight constituting a second arm of said bridge, a relay across said bridge, the electric indicating device comprises an electric meter with an anti-logarithmic scale in a metering circuit separate and distinct from that of the Wheatstone bridge, said metering circuit having resistances identical with the respective resistances in the recited arms of the Wheatstone bridge, said circuit control means determining the setting of said resistances in the metering circuit to be at all times identical with those in the recited Wheatstone bridge arms, said relay serving selectively, in response to the relative currents in the two arms of the Wheatstone bridge, to pass through the meter either the current through one or the other of said resistances in the meter circuit.

9. The combination recited in claim 4 in which the electric indicating device is normally connected for response to current equal to that through the weight controlled current limiting means, and discriminator means designed to be responsive to a flow of a current through the volume controlled current limiting means in excess of that through the weight controlled current limiting means disconnects the meter from the weight controlled side and connects it for response to a current equal to that passing through the volume controlled current limiting means.

10. The combination recited in claim 4 in which the parallel connected current limiting means that determines the volume constitutes one arm of a Wheatstone bridge, the weight controlled current limiting means constitutes a second arm of such bridge, a polarized relay connected across said bridge is actuated by unbalance in said bridge in but one direction, said relay normally connnecting said electric indicating device for response to a current equal to that through the weight controlled current limiting means and when actuated serving to disconnect the meter from the weight controlled side and to connect it for response to a current equal to that passing through the volume controlled current limiting means.

11. The combination recited in claim 4 in which the electric indicating device is an electric meter with an anti-logarithmic scale and in which said meter is in a circuit separate and distinct from that of said current limiting means, said meter circuit having distinct sets of current limiting means identical with the respective current limiting means first mentioned, in which the said circuit control means determines also the setting of the current limiting means in the meter circuit in order to maintain the latter at all times in setting identical with that of the first named current limiting means.

12. The combination recited in claim 11 in which each of the two parallel connected current limiting means comprises a bank of series connected resistors and in which each dimension of an object being rated other than the very smallest one within the range of the equipment, controls one or more switches that short circuits resistances in excess of those required to pass the desired current proportional to the logarithm of the respective dimension of the object.

13. The combination recited in claim 11 in which the circuit control means for each of the current limiting means comprises electrically insulated ganged switch arms operating upon the corresponding sets of current limiting means in unison.

14. The combination recited in claim 11 in which a resistor of magnitude to pass a current proportional to the logarithm of a multiplier is associated with manual control means selectively to be placed when desired in parallel with either of the current limiting means in the metering circuit.

15. Equipment for determining a function of volume and weight of an object, which comprises current limiting means under the control of at least two dimensions of the contour of an object, and each of magnitude to pass a current proportional to the logarithm of the corresponding dimension, such current limiting means being connected in parallel to pass a combined current proportional to the logarithm of the product of such dimensions, a weighing scale, circuit control means responsive to the weight of such object and of magnitude to pass a current proportional to the logarithm of such weight, and means correlating the dimension-controlled and the weight controlled currents to effect a reading determined by combination of dimensions and weight.

16. Equipment for determining the density of a rectangular object which comprises current limiting means under the control of the three edges at one corner of the object to be rated and each of magnitude to pass a current proportional to the logarithm of the corresponding dimension, such current limiting means being connected in parallel to pass a combined current proportional to the logarithm of the volume of such object, a weighing scale, circuit control means responsive to the weight of such object and of magnitude to pass a current proportional to the logarithm of such weight but always greater than the volume controlled current, the weight controlled current being connected to flow in opposition to the volume controlled current, and a meter having an anti-logarithmic scale to read the resultant of said opposed currents as the quotient or density of the object.

References Cited in the file of this patent

UNITED STATES PATENTS

| | | |
|---|---|---|
| 1,560,046 | Dye | Nov. 3, 1925 |
| 1,573,850 | Naiman | Feb. 23, 1926 |
| 1,853,198 | Breaden | April 12, 1932 |
| 2,025,407 | Williams | Dec. 24, 1935 |
| 2,108,575 | Benedict | Feb. 15, 1938 |
| 2,244,369 | Martin | June 3, 1941 |
| 2,431,696 | Keister | Dec. 2, 1947 |
| 2,584,897 | Marco | Feb. 5, 1952 |